United States Patent Office 3,663,619
Patented May 16, 1972

3,663,619
PROCESS FOR THE PREPARATION OF 2,2',6,6'-TETRABROMO-4,4'-METHYLENEDIANILINE
Robert M. Thomas and Rastko I. Mamuzic, West Lafayette, Ind., assignors to Great Lakes Chemical Corporation, West Lafayette, Ind.
No Drawing. Filed July 22, 1969, Ser. No. 843,755
Int. Cl. C07c 85/08
U.S. Cl. 260—570 D
3 Claims

ABSTRACT OF THE DISCLOSURE 2,2',6,6'-tetrabromo-4,4'-methylenedianiline is produced in high yield by addition of liquid bromine to a methanolic solution of 4,4'-methylenedianiline. Refluxing produces a high yield of methyl bromide as by-product. Washing the separated product with methanol produces a high purity product in high yield.

BACKGROUND OF THE INVENTION

Field of the invention

This invention is directed to an improved process for the bromination of 4,4'-methylenedianiline to produce 2,2',6,6'-tetrabromo-4,4'-methylenedianiline of high purity in high yields and a good yield of methyl bromide as a valuable by-product.

Description of the prior art

Prior art methods of brominating anilines have used an acidic aqueous solvent and bromine in the vapor phase. See U.S. 3,418,370. While product yields of the above-described processes have been satisfactory, removal of by-products therefrom has proven to be both time-consuming and expensive. For example, the product must be subjected to multiple aqueous washings, both alkaline and acidic. Moreover, such processes produce hydrogen bromide as a by-product of the reaction, a product of insufficient commercial value to warrant recovering, which renders the process more expensive. Additionally, according to the prior art method, bromine is used in its vapor phase, which is highly reactive, and is entrained in a stream of inert gas such as nitrogen, which requires expensive metering equipment to introduce the required amount of bromine into the reaction vessel.

It is therefore an object of the present invention to produce 2,2',6,6'-tetrabromo-4,4'-methylenedianiline in high yield and purity.

Another object of the invention is to markedly reduce the amount of time necessary to brominate 4,4'-methylenedianiline and purify the brominated product.

Another object of the invention is to utilize a purification solvent capable of being re-cycled and re-used for further purification of the product.

Another object of the invention is to produce a by-product which is of sufficient commercial value to render the process more economical.

Another object of the invention is to utilize bromine in its liquid phase thereby obviating problems of inert carrier gases, flow-metering equipment, and pressure within the reaction vessel.

Further objects of the invention will be apparent to those skilled in the art to which the invention pertains.

SUMMARY OF THE INVENTION

To 4,4'-methylenedianiline dissolved in anhydrous methanol is added at least 4 molar equivalents of liquid bromine to produce 2,2',6,6'-tetrabromo-4,4'-methylenedianiline according to the following formulae:

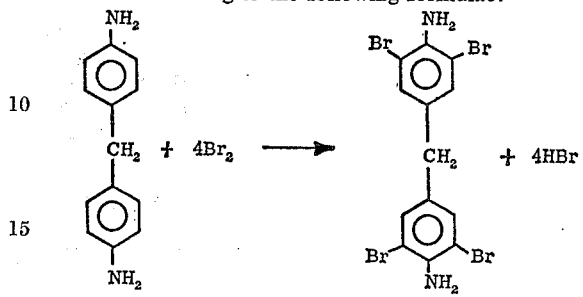

The reaction mixture is then refluxed for several hours, thereby converting the hydrogen bromide to methyl bromide:

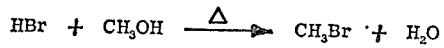

The methyl bromide thus-produced is collected. The product is separated from the reaction solvent and washed with methanol to substantially constant weight, then dried.

DETAILED DESCRIPTION OF THE INVENTION

The present invention is carried out in anhydrous methanol so that the hydrogen bromide by-product can be converted during the period of refluxing with the methanol in high yield to methyl bromide. The methyl bromide thus-produced is collected and retained as a valuable and saleable by-product. The preferred method of collecting the methyl bromide is a Dry-Ice trap.

4,4'-methylenedianiline is dissolved in anhydrous methanol, for example, in a ratio of about 5:1 to 100:1, preferably about 15 parts by volume of methanol to amine by weight. A suitable reaction vessel is equipped with a thermometer; mechanical stirrer; a dropping funnel or other apparatus for the introduction of liquid bromine; a reflux condenser; and a trap for collecting the methyl bromide.

To the methanolic amine solution is slowly added 4 molar equivalents of liquid bromine while maintaining the reaction temperature below 60° C., preferably 0 to 35° C., more preferably at about 30° C. An excess of bromine is preferably employed, e.g., up to 15 percent molar excess, more preferably about 10 percent excess.

Following the addition of the liquid bromine to the dissolved amine, the reaction mixture is heated above room temperature, preferably at reflux temperature until methyl bromide evolution substantially ceases, e.g., up to 24 hours, preferably from 3 to 5 hours. The methyl bromide thus-produced is removed through the reflux condenser and collected.

During the refluxing, from 60 to 95 percent, usually at least 75 percent, of the hydrogen bromide is converted to methyl bromide.

The reaction mixture is then filtered. The isolated product is a solid of high purity. This product is then washed with solvent, e.g., several portions of methanol to a substantially constant weight, i.e., until a colorless filtrate is obtained, to obain product of very high purity.

The yield of pure 2,2',6,6'-tetrabromo-4,4'-methylenedianiline, after all extractables have been removed with methanol, is significantly higher than obtainable by prior art methods, usually over 90 percent.

The reaction time, from dissolution of the amine to final product purification typically requires about 4.5 hours, compared with prior art methods which require at least twice the time. In fact, the product is formed in less than one hour and typically in about 15 minutes or less. The balance of the time is used for stripping and collecting the methyl bromide.

UTILITY OF PRODUCTS

The known 2,2',6,6'-tetrabromo-4,4'-methylenedianiline is useful as an intermediate to the corresponding isocyanate, which is an intermediate in the synthesis of fire-retardant polyurethanes.

The following examples are illustrative of the process of this invention, which is not limited thereto. All temperatures are expressed in degrees centigrade. Yields are calculated on the basis of 4,4'-methylenedianiline used in the reaction. All parts and percentages are by weight.

COMPARATIVE EXAMPLE A

The process of the invention was compared to the prior art process disclosed in Example 1 of U.S. 3,418,370. The reaction was conducted in the manner of Example 1 of U.S. 3,418,370, using 1/10 the quantities as recited therein.

49.5 g. of 4,4'-methylenedianiline were dissolved in an aqueous solution of 50 ml. concentrated hydrochloric acid and 750 ml. water, resulting in a clear, yellow solution. 160 g. of bromine were added entrained in a nitrogen stream containing bromine vapor as shown in Table I, for a period of 4 hours. The reaction mixture was stirred for an additional hour, then made alkaline by the addition of sodium hydroxide solution with stirring and cooling. The resulting alkaline suspension was filtered through sintered glass funnels and the clear, colorless filtrate was discarded. The brominated product was then washed with water by slurrying 3 times with 500 ml. portions of deionized water, then pressed and vacuum dried on filter funnels. The insoluble product was suspended in water and the pH of the suspension was made slightly acidic by the addition of hydrochloric acid. The suspension was then made slightly alkaline (pH 7-8) by the addition of sodium bicarbonate powder with stirring, then filtered and again washed. The 2,2',6,6'-tetrabromo-4,4'-methylenedianiline thus-produced was dried to a constant weight. Calculated: 128.5 g. Found: 124.7 g. (97.0 percent of theory).

The pink crystals thus-produced were freed of extractables by extraction with methanol for 5 hours in a Soxhlet extractor. At the end of 5 hours the methanol extract remained slightly colored. The product was dried to constant weight. Calculated: 128.5 g.; Found: 111.2 g. (86.5 percent of theory).

Because 13.5 g. of material was extracted, the product before extraction had a purity of 89.2 percent.

EXAMPLE I

Following the process of this invention, 49.5 g. (0.25 mole) of 4,4'-methylenedianiline were dissolved in 743 ml. of methanol in a few minutes at room temperature. A total of 58.5 ml. of liquid bromine, (176.0 g.; 1.1 mole) was charged into a dropping funnel. The flask containing the dissolved amine was immersed in a water bath and the liquid bromine was added as shown in Table I over a period of 15 minutes.

The reaction mixture was warmed to 60°. Reflux started and was maintained wit hconstant stirring for 4.5 hours, with the methyl bromide being collected as it formed in a Dry Ice trap. Heating was discontinued, the reaction mixture was cooled to about 20° and then stirred for 30 minutes.

Methyl bromine yield: Calculated: 95.0 g.; Found: 74.0 g. (77.9 percent of theory).

The reaction mixture was filtered and a pale pink solid separated from a reddish-brown filtrate, indicating an excess of bromine. The 2,2',6,6'-tetrabromo-4,4'-methylenedianiline thus-obtained was slurried on the funnel using portions of methanol totaling 500 ml. It was then dried to a constant weight. Calculated: 128.5 g.; Found: 122.6 g. (95.4 percent of theory).

The 2,2',6,6'-tetrabromo-4,4'-methylenedianiline thus-obtained was extracted for 5 hours with 500 ml. of methanol in a Soxhlet extractor to give a virtually colorless product and a red methanol solution. The extracted sample was stripped of volatiles by heating for 3 hours to a constant weight in a rotating vacuum flask. Calculated: 128.5 g.; Found: 119.4 g. (92.9 percent of theory).

Because only 3.2 g. was lost on extraction, the product before extraction had a purity of 97.5 percent.

TABLE I

Example A

| Time (min.) | Temp. | $Br_2$ [a] | Remarks |
|---|---|---|---|
| 0 | 23 | 320 | Pale green. |
| 5 | | | |
| 10 | 25 | 650 | Do. |
| 15 | | | |
| 20 | 26 | 900 | Bromine escapes through system. |
| 30 | 28 | 600 | Bromine completely reacts. |
| 40 | 29 | 600 | Green-yellow color. |
| 50 | 30 | 600 | Do. |
| 60 | 31 | 600 | Do. |
| 120 | 35 | 600 | Tan color. |
| 180 | 39 | 600 | Do. |
| 240 | 46 | 600 | Pale yellow color. |

Example I

| | | | |
|---|---|---|---|
| 0 | 22 | [b] 58.5 | Clear yellow solution. |
| 5 | 32 | 40 | Yellow-tan suspension. |
| 10 | 35 | 20 | Do. |
| 15 | 39 | 0 | Do. |
| 60 | 64 | 0 | Pale orange suspension. |
| 120 | 65 | 0 | Do. |
| 180 | 65 | 0 | Do. |
| 240 | 65.5 | 0 | Do. |

[a] Measured as ml. of bromine per minute entrained in a nitrogen stream.
[b] Measured as ml. of bromine.

EXAMPLE II

A total of 19.8 g. (0.1 mole) of 4,4'-methylenedianiline was placed in a 500 ml. four neck round bottom flask equipped with a mechanical stirrer, thermometer, 60 ml. dropping funnel, and a reflux condenser. The condenser was connected to a Dry-Ice trap for collection of methyl bromide. A clear yellow solution resulted upon its addition to 297 ml. (a 15:1 weight to volume ratio based on the methylenedianiline) of methanol at room temperature.

Then 70.3 g. (representing 0.44 mole) of liquid bromine was added from the dropping funnel over a period of eight minutes. The reaction temperature was maintained below 30° C. by cooling the flask with tap water. The resulting mixture was ocher colored and paste-like.

The reaction mixture thereby produced was stirred and refluxed for a period of five hours. 18 ml. of methyl bromide was collected in the Dry Ice trap.

While the reaction mixture was still warm, it was filtered through a sintered glass funnel, giving a pink solid as the crude product. The crude product was washed on the sintered glass funnel by slurrying it with additional quantities of methanol. This washing procedure was continued until a colorless filtrate was obtained leaving a pale ocher-colored product.

48.4 g. of 2,2',6,6'-tetrabromo-4,4'-methylenedianiline was obtained after the above-described washing, a 94.2 percent yield. The yield of methyl bromide was 84.3 percent (32.0 g.).

What is claimed is:

1. A process for the production of 2,2',6,6'-tetrabromo-4,4'-methylenedianiline together with methyl bromide as by-product which consists essentially of the steps of (a) adding at least 4 molar equivalents of liquid bromine to a solution of 4,4'-methylenedianiline in anhydrous methanol;

(b) heating the resulting mixture until the formation of methyl bromide is substantially complete;
(c) collecting the methyl bromide thus-produced;
(d) separating the precipitated product from the methanol; and
(e) washing the separated 2,2',6,6' - tetrabromo-4,4'-methylenedianiline with a solvent to a substantially constant weight.

2. A process according to claim 1 wherein a bromination temperature between 0° and 35° C. is employed, the mixture is refluxed after the addition of bromine, and the separated 2,2',6,6'-tetrabromo-4,4'-methylenedianiline is washed with methanol to a substantially constant weight.

3. A process according to claim 2 wherein a volume to weight ratio of methanol to 4,4'-mehylenedianiline of about 15 to 1 is employed.

References Cited

UNITED STATES PATENTS 1,777,266  9/1930  Kalischer et al. _____ 260—570
3,418,370  12/1968  Foster et al. _____ 260—570

OTHER REFERENCES

Rodd, "Chemistry of Carbon Compounds," vol. IIIA, pp. 214–15 (1954).

Tarnawski, "Chemical Abstracts," vol. 58, p. 5469 (1963).

ROBERT V. HINES, Primary Examiner

U.S. Cl. X.R.

260—453 AM, 652 P, 694